(12) United States Patent
Lee et al.

(10) Patent No.: US 8,969,444 B2
(45) Date of Patent: Mar. 3, 2015

(54) FLAME RETARDANT THERMOPLASTIC RESIN COMPOSITION

(71) Applicant: Cheil Industries Inc., Gumi-si (KR)

(72) Inventors: Jin Seong Lee, Uiwang-si (KR);
Gyeong Ha Chae, Uiwang-si (KR);
Young Chul Kwon, Uiwang-si (KR);
Kang Yeol Park, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 23 days.

(21) Appl. No.: 13/974,104

(22) Filed: Aug. 23, 2013

(65) Prior Publication Data
US 2014/0235768 A1 Aug. 21, 2014

(30) Foreign Application Priority Data
Feb. 18, 2013 (KR) .......................... 10-2013-0016868

(51) Int. Cl.
*C08K 5/34* (2006.01)
*C08L 25/06* (2006.01)
(52) U.S. Cl.
CPC ..................................... *C08L 25/06* (2013.01)
USPC ......................................................... 524/101
(58) Field of Classification Search
USPC ........................................................ 524/101
See application file for complete search history.

(56) References Cited

U.S. PATENT DOCUMENTS 4,692,490 A * 9/1987 Abolins ........................ 524/371
2006/0106141 A1* 5/2006 Yi et al. ........................ 524/115

FOREIGN PATENT DOCUMENTS

KR 2010-0073148 A 7/2010

* cited by examiner

*Primary Examiner* — Ling Choi
*Assistant Examiner* — Thuy-Ai Nguyen
(74) *Attorney, Agent, or Firm* — Additon, Higgins & Pendleton, P.A.

(57) ABSTRACT

A polycarbonate resin composition includes (A) about 90 to about 97% by weight of a rubber-reinforced polystyrene resin, (B) about 3 to about 10% by weight of a polyphenylene ether resin, (C) about 10 to about 20 parts by weight of a halogen compound including a triazine group, or a mixture of a halogen compound including a triazine group and a diphenyl ethane bromide compound based on about 100 parts by weight of a base resin comprising (A) and (B), and (D) about 0.01 to about 3 parts by weight of an antimony compound based on about 100 parts by weight of the base resin comprising (A) and (B). The composition can exhibit excellent flame retardancy, colorability and injection molding thermal stability.

12 Claims, No Drawings

FLAME RETARDANT THERMOPLASTIC RESIN COMPOSITION

CROSS-REFERENCE TO RELATED APPLICATION

This application claims priority under 35 USC Section 119 to and the benefit of Korean Patent Application No. 10-2013-0016868, filed Feb. 18, 2013, the entire disclosure of which is incorporated herein by reference.

FIELD OF THE INVENTION

The present invention relates to a flame retardant thermoplastic resin composition.

BACKGROUND OF THE INVENTION

A polyphenylene ether resin can have good thermal stability and mechanical strength, and a product made using the same can have excellent dimensional stability when manufactured. However, because it is hard to manufacture the polyphenylene ether resin alone, polyphenylene ether resin can be blended with a polystyrene resin having good compatibility. The blend can then be used in the production of various products such as interior/exterior materials for electronic devices.

While the blend of polyphenylene ether resin and polystyrene resin has good processability, it can also have deteriorated impact strength. Degradation of impact strength can be prevented by using a rubber-reinforced polystyrene resin in the blend of polyphenylene ether resin and polystyrene resin. However, the resin composition should have flame retardancy when used to produce products such as electrical/electronic products or office machines, such as monitors and faxes, which generate heat in operation.

A known method for imparting good flame retardancy is to use a halogen compound and an antimony compound together. For example, acrylonitrile/butadiene/styrene (ABS) resin or polystyrene (HIPS) resin can be mixed with halogen compounds and antimony compounds at a ratio of 2.5 to 4:1 in order to impart flame retardancy.

However, if an antimony trioxide is used as the antimony compound, the colorability of the resin composition can deteriorate because antimony trioxide is a white inorganic material. Thus, it can be difficult to provide color to the product, particularly a deep black color. Also, if the antimony compound is used with the halogen compound, there can be problems such as discoloration and generation of gas at high injection molding temperatures because of the reaction between the antimony compound and the halogen compound.

If the halogen compound is used without the antimony compound, the same flame retardancy can be obtained if double or three times the amount of the halogen compound is used. However, in this case, mechanical properties, such as impact strength, tensile strength, flexural strength and the like, and thermal properties, such as heat resistance and heat deflection temperature, can be degraded.

In addition, when the halogen compound and the antimony compound are used together, it can be difficult to make a light weight product due to an increase in the specific gravity of the resin composition.

A bromine-based flame retardant and a non-halogen-based flame retardant can be used to improve the flame retardancy of a blend of rubber-reinforced polystyrene resin and polyphenylene ether resin. However, a large amount of polyphenylene ether resin is used to improve flame retardancy, which can degrade the fluidity (workability), and the generation of gas in use at a high temperature leads to degradation of thermal stability. To solve this problem, a fluidity enhancer can be necessary to improve fluidity, and a thermal stabilizer can also be necessary to improve the thermal stability.

Korean Patent Publication No. 2010-0073148 discloses a flame retardant thermoplastic resin composition using a base resin comprising rubber-reinforced polystyrene resin and polyphenylene oxide resin with a diphenyl ethane bromide mixture. However, in this case, fluidity can be deteriorated due to using a large amount of polyphenylene oxide and diphenyl ethane bromide mixture.

SUMMARY OF THE INVENTION

The present invention provides a thermoplastic resin composition that can have excellent flame retardancy.

The present invention also provides a thermoplastic resin composition that can have excellent colorability.

The present invention further provides a thermoplastic resin composition that can have excellent injection molding thermal stability.

The present invention further provides a thermoplastic resin composition that can have excellent fluidity.

The present invention further provides a thermoplastic resin composition that can have low specific gravity.

The flame retardant thermoplastic resin composition according to the present invention comprises (A) about 90 to about 97% by weight of a rubber-reinforced polystyrene resin, (B) about 3 to about 10% by weight of a polyphenylene ether resin, (C) about 10 to about 20 parts by weight of a halogen compound including a triazine group, or a mixture of a halogen compound including a triazine group and a diphenyl ethane bromide compound based on about 100 parts by weight of a base resin comprising (A) and (B), and (D) about 0.01 to about 3 parts by weight of an antimony compound based on about 100 parts by weight of the base resin comprising (A) and (B).

The rubber-reinforced polystyrene resin (A) can comprise about 1 to about 30% by weight of a rubber polymer and about 70 to about 99% by weight of an aromatic monoalkenyl monomer. The rubber-reinforced polystyrene resin (A) further can comprise one or more monomers selected from alkyl ester monomers of (meth)acrylic acid and/or vinyl cyanide monomers.

The polyphenylene ether resin (B) may include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene)ether, copolymer of poly(2,6-diethyl-1,4-phenylene)ether and poly(2,3,5-triethyl-1,4-phenylene)ether, or a combination thereof.

The halogen compound including a triazine group may include 2,4,6-tris(2,4,6-tribromophenoxy)-1,3,5-triazine and the diphenyl ethane bromide compound may include decabromodiphenyl ethane.

The antimony compound (D) may be antimony trioxide, antimony pentoxide or a combination thereof.

The flame retardant thermoplastic resin composition according to the present invention may further include one or more additives, such as polymerization initiators, antioxidants, impact modifiers, lubricants, fillers, coupling agents, photostabilizers, antidripping agents, antistatic agents, dispersants and colorants.

Molded articles according to the present invention can be molded from the flame retardant thermoplastic resin composition of the present invention.

The present invention can provide a flame retardant thermoplastic resin composition that can have excellent flame retardancy, colorability, injection molding thermal stability, and/or fluidity as well as low specific gravity.

DETAILED DESCRIPTION OF THE INVENTION

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to a flame retardant thermoplastic resin composition that can have excellent flame retardancy as well as colorability and injection molding thermal stability.

The flame retardant thermoplastic resin composition according to the present invention comprises (A) about 90 to about 97% by weight of a rubber-reinforced polystyrene resin, (B) about 3 to about 10% by weight of a polyphenylene ether resin, (C) about 10 to about 20 parts by weight of a halogen compound including a triazine group, or a mixture of a halogen compound including a triazine group and a diphenyl ethane bromide compound based on about 100 parts by weight of a base resin comprising (A) and (B), and (D) about 0.01 to about 3 parts by weight of an antimony compound based on about 100 parts by weight of the base resin comprising (A) and (B).

(A) Rubber-Reinforced Polystyrene Resin

A rubber-reinforced polystyrene resin (A) according to the present invention is prepared by polymerizing rubber polymer with an aromatic monoalkenyl monomer.

Examples of the rubber polymer may include without limitation diene rubbers, such as butadiene rubber, copolymers prepared by copolymerizing butadiene and styrene, poly(acrylonitrile-butadiene), and the like, saturated rubbers including hydrogenated diene rubbers, isoprene rubbers acrylic rubbers, ethylene-propylene-diene monomer terpolymers (EPDM), and the like, and combinations thereof. In exemplary embodiments, polybutadiene, a copolymer prepared by copolymerizing butadiene and styrene, isoprene rubber, and/or alkyl acrylate rubber be used.

The rubber-reinforced polystyrene resin can include the rubber polymer in an amount of about 1 to about 30% by weight, for example about 3 to about 15% by weight, based on 100% by weight of the rubber-reinforced polystyrene resin. In some embodiments, the rubber-reinforced polystyrene resin can include the rubber polymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the rubber polymer may be present in an amount of from about any of the foregoing amounts to about any other of the foregoing amounts.

If the rubber polymer content is less than about 1% by weight, impact strength of the flame retardant thermoplastic resin can be degraded. If the rubber polymer content is more than about 30% by weight, flame retardancy, spiral length, and the degree of blackness can be degraded.

In order to exhibit appropriate physical properties in a base resin comprising the rubber-reinforced polystyrene resin (A) and the polyphenylene ether resin (B), the rubber particles can have a Z-average particle size of about 0.1 to about 6.0 μm, for example about 0.25 to about 3.5 μm.

The rubber polymer may be dispersed in the rubber-reinforced polystyrene resin (A) in bimodal form or trimodal form. In one embodiment, the rubber-reinforced polystyrene resin (A) may be a mixture of a rubber-reinforced polystyrene resin which comprises a rubber polymer having an average particle diameter of about 0.1 to about 1 μm and a rubber-reinforced polystyrene resin which comprises a rubber polymer having an average particle diameter of about 1 to about 6 μm.

Examples of the aromatic monoalkenyl monomer may include without limitation styrene, α-methyl styrene, β-methyl styrene, p-methyl styrene, p-tert-butyl styrene, ethyl styrene, and the like, and combinations thereof.

As used herein, the term "polystyrene resin" used in reference to the rubber-reinforced polystyrene resin refers to homopolymers of an aromatic monoalkenyl monomer, copolymers of two or more different aromatic monoalkenyl monomers, and combinations of such homopolymers and/or copolymers.

The rubber-reinforced polystyrene resin may include the aromatic monoalkenyl monomer in an amount of about 70 to about 99% by weight, for example about 85 to about 97% by weight, based on 100% by weight of the rubber-reinforced polystyrene resin.

The rubber-reinforced polystyrene resin (A) may further comprise one or more additional monomers. Examples of the additional monomers include without limitation C1-C10 alkyl ester monomers of acrylic acid and/or methacrylic acid, vinyl cyanide compounds, and the like. The additional monomers can provide chemical resistance, processiblity and/or thermal resistance.

The rubber-reinforced polystyrene resin (A) may include the alkyl ester monomer of acrylic acid and/or methacrylic acid and/or vinyl cyanide monomer in an amount of about 0 to about 40% by weight based on 100% by weight of the rubber-reinforced polystyrene resin (A). In some embodiments, the rubber-reinforced polystyrene resin (A) may include the alkyl ester monomer of acrylic acid and/or methacrylic acid and/or vinyl cyanide monomer in an amount of 0% by weight (the monomer is not present), about 0 (the monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the alkyl ester monomer of acrylic acid and/or methacrylic acid and/or vinyl cyanide monomer may be present in an amount of from about any of the foregoing amounts to about any other of the foregoing amounts.

The rubber-reinforced polystyrene resin (A) may be prepared by thermal polymerization without a polymerization initiator, or may be prepared by polymerizing in the presence of a polymerization initiator. When polymerized in the presence of the polymerization initiator, the polymerization initiator may be a peroxide initiator, such as benzoyl peroxide, t-butyl hydroperoxide, acetyl peroxide, cumene hydroperoxide, and the like, an azo initiator, such as azobis isobutyronitrile, and the like, and combinations thereof, but is not limited thereto.

The rubber-reinforced polystyrene resin (A) can be prepared by bulk polymerization, suspension polymerization, emulsion polymerization or mixed methods thereof. In exemplary embodiments, bulk polymerization is used.

The rubber-reinforced polystyrene resin (A) according to the present invention can be included in an amount of about 90 to about 97% by weight based on 100% by weight of a base resin comprising the rubber-reinforced polystyrene resin (A) and the polyphenylene ether resin (B). In some embodiments, the base resin may include the rubber-reinforced polystyrene resin (A) in an amount of about 90, 91, 92, 93, 94, 95, 96, or 97% by weight. Further, according to some embodiments of the present invention, the rubber-reinforced polystyrene resin (A) may be present in an amount of from about any of the foregoing amounts to about any other of the foregoing amounts.

When the amount of the rubber-reinforced polystyrene resin (A) is less than about 90% by weight, spiral length can be deteriorated. When the amount of the rubber-reinforced polystyrene resin (A) is more than about 97% by weight, the flame retardancy can be deteriorated.

(B) Polyphenylene Ether Resin

In the case of using the rubber-reinforced polystyrene resin (A) alone, desired flame retardancy cannot be achieved, and the thermal resistance can be deteriorated, so the polyphenylene ether resin (B) is added in the rubber-reinforced polystyrene resin (A), and the combination thereof may be used as a base resin.

Examples of the polyphenylene ether resin (B) may include without limitation poly(2,6-dimethyl-1,4-phenylene) ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymers of poly(2,6-dimethyl-1,4-phenylene)ether and poly(2,3,6-trimethyl-1,4-phenylene)ether, copolymers of poly(2,6-diethyl-1,4-phenylene) ether and poly(2,3,5-triethyl-1,4-phenylene)ether, and the like, and combinations thereof. In exemplary embodiments a copolymer of poly(2,6-dimethyl-1,4-phenylene)ether and poly(2,3,6-trimethyl-1,4-phenylene)ether and/or poly(2,6-dimethyl-1,4-phenylene)ether, for example poly(2,6-dimethyl-1,4-phenylene)ether, may be used.

The intrinsic viscosity of polyphenylene ether resin (B) is not particularly limited. Taking into consideration the thermal stability and workability of the flame retardant thermoplastic resin composition, the intrinsic viscosity of the polyphenylene ether resin (B) can be about 0.2 to about 0.8, which is measured in chloroform solvent at 25° C.

The base resin can include the polyphenylene ether resin (B) in an amount of about 3 to about 10% by weight based on 100% by weight of the base resin comprising the rubber-reinforced polystyrene resin (A) and the polyphenylene ether resin (B). In some embodiments, the base resin may include the polyphenylene ether resin (B) in an amount of about 3, 4, 5, 6, 7, 8, 9, or 10% by weight. Further, according to some embodiments of the present invention, the polyphenylene ether resin (B) may be present in an amount of from about any of the foregoing amounts to about any other of the foregoing amounts.

When the amount of the polyphenylene ether resin (B) is less than about 3% by weight, flame retardancy can be deteriorated. When the amount of the polyphenylene ether resin (B) is more than about 10% by weight, fluidity can be deteriorated, and thermal stability can be also deteriorated due to the generation of gas in use at a high temperature.

(C) Halogen Compound Including a Triazine Group

A halogen compound including a triazine group (C) according to the present invention is a flame retardant to impart flame retardancy to the flame retardant thermoplastic resin composition.

In exemplary embodiments, the halogen compound including a triazine group (C) may include 2,4,6-tris(2,4,6-tribromophenoxy)-1,3,5-triazine.

The halogen compound including a triazine group (C) can further include a diphenyl ethane bromide compound. In exemplary embodiments, the diphenyl ethane bromide compound may include decabromodiphenyl ethane.

The flame retardant thermoplastic resin composition can include the halogen compound including a triazine group (C) in an amount of about 10 to about 20 parts by weight based on about 100 parts by weight of the base resin comprising the rubber-reinforced polystyrene resin (A) and the polyphenylene ether resin (B). In some embodiments, the flame retardant thermoplastic resin composition may include the halogen compound including a triazine group (C) in an amount of about 10, 11, 12, 13, 14, 15, 16, 17, 18, 19, or 20 parts by weight. Further, according to some embodiments of the present invention, the halogen compound including a triazine group (C) may be present in an amount of from about any of the foregoing amounts to about any other of the foregoing amounts.

When the amount of the halogen compound including a triazine group (C) is less than about 10 parts by weight, it can be difficult to achieve the desired flame retardancy. When the amount of the halogen compound including a triazine group (C) is more than about 20 parts by weight, physical properties, such as injection molding workability and mechanical strength, can be deteriorated.

(D) Antimony Compound

An antimony compound (D) according to the present invention is an auxiliary flame retardant to impart appropriate flame retardancy to the flame retardant thermoplastic resin composition.

Examples of the antimony compound (D) may include without limitation antimony trioxide, antimony pentoxide and the like, and combinations thereof. In exemplary embodiments, antimony trioxide can be used. When using antimony trioxide, the antimony trioxide can have an average particle diameter of about 0.01 µm to about 6.0 µm, for example about 0.02 µm to about 3.0 µm, and when using antimony pentoxide, the antimony pentoxide can have an average diameter of about 0.01 µm to about 1.0 µm, for example about 0.02 µm to about 0.5 µm.

The flame retardant thermoplastic resin composition can include the antimony compound (D) in an amount of about 0.01 to about 3 parts by weight based on about 100 parts by weight of the base resin comprising the rubber-reinforced polystyrene resin (A) and the polyphenylene ether resin (B). In some embodiments, the flame retardant resin composition may include the antimony compound (D) in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments of the present invention, the antimony compound (D) may be present in an amount of from about any of the foregoing amounts to about any other of the foregoing amounts.

When the amount of the antimony compound (D) is less than about 0.01 parts by weight, it can be difficult to achieve a flame retardancy synergistic effect. When the amount of the antimony compound (D) is more than about 3 parts by weight, physical properties, such as colorability and injection molding thermal stability can be deteriorated.

(E) Additives

The flame retardant thermoplastic resin composition according to the present invention can comprise one or more additives (E). Examples of the additives can include without limitation polymerization initiators, antioxidants, impact modifiers, lubricants, fillers, coupling agents, photostabilizers, antidripping agents, antistatic agents, dispersants, colorants, and the like, and combinations thereof.

Examples of the antioxidant that can be used in the present invention include without limitation phenol-type antioxidants, phosphate-type antioxidants, thioether-type antioxidants, amine-type antioxidants, and the like, and combinations thereof. Examples of the colorant that can be used in the present invention include without limitation titanium dioxide, carbon black, and the like, and combinations thereof. Examples of the carbon black that can be used in the present invention include without limitation graphitized carbon, furnace black, acetylene black, ketjen black, and the like, and combinations thereof. Examples of the antidripping agent that can be used in the present invention include without limitation polytetrafluoroethylene, and the like.

The flame retardant resin composition may include the additives (E) in an amount of about 0.1 to about 7 parts by weight based on about 100 parts by weight of the base resin comprising the rubber-reinforced polystyrene resin (A) and the polyphenylene ether resin (B).

The flame retardant thermoplastic resin composition according to the present invention can have a flame resistance of V0 measured for a 1.5 mm thick specimen in accordance with UL 94.

The flame retardant thermoplastic resin composition according to the present invention can have a number of gas bursts of about 0 to about 15 times when maintained in an injection molding device with an inner temperature of 250° C. for 10 minutes.

The flame retardant thermoplastic resin composition according to the present invention can have an Izod impact strength of about 10 kgf·cm/cm to about 15 kgf·cm/cm measured for a ⅛ inch thick specimen in accordance with ASTM D256. For example, the flame retardant thermoplastic resin composition according to the present invention can have an Izod impact strength of about 11 kgf·cm/cm, about 12 kgf·cm/cm, about 13 kgf·cm/cm, about 14 kgf·cm/cm, or about 15 kgf·cm/cm.

The flame retardant thermoplastic resin composition according to the present invention can have a specific gravity of about 1.135 to about 1.155 measured in accordance with ASTM D792. For example, the flame retardant thermoplastic resin composition according to the present invention can have a specific gravity of about 1.135, about 1.140, about 1.145, about 1.148, about 1.149, about 1.150, or about 1.155.

The flame retardant thermoplastic resin composition according to the present invention can have a length of specimen (spiral) of about 420 to about 550 mm measured after the resin composition is molded into a specimen with a thickness of 2.0 mm and a width of 10 mm at 230° C. For example, the spiral length of the flame retardant thermoplastic resin composition according to the present invention can be about 420 mm, about 430 mm, about 450 mm, about 470 mm, about 480 mm, about 510 mm, about 520 mm, about 530 mm, or about 550 mm.

The flame retardant thermoplastic resin composition according to the present invention can have a value of L of about 27 to about 35 in accordance with ASTM D1925, which is measured using a CCM device (Konica Minolta, Inc.). For example, the flame retardant thermoplastic resin composition can have a L value of about 27.3, about 27.5, about 29.1, about 31.1, about 31.2, about 31.3, about 31.4, about 32.3, about 32.5, about 32.9, or about 33.1.

The flame retardant thermoplastic resin composition according to the present invention can be prepared using any suitable conventional method to prepare a resin composition. For example, the components of the invention and the optional additives can be mixed in a mixer at the same time and the mixture can be melt-extruded through an extruder in the form of pellets.

The prepared pellets can be manufactured into various molded articles using a variety of molding methods, such as injection molding, vacuum molding, casting molding, and the like.

The molded articles can have excellent flame retardancy, colorability and injection molding thermal stability, and can be widely used, without limitation, as parts of electrical and electronic products, exterior materials, parts of automobile, miscellaneous goods, structural frames, and the like.

The present invention will be further defined in the following examples, which are intended for the purpose of illustration and are not to be construed as in any way limiting the scope of the present invention.

EXAMPLES

The particulars of each component used in the Examples and Comparatives Examples are as follows:

(A) Rubber-Reinforced Polystyrene Resin

High Strength polystyrene resin (Product name: HG-1760) manufactured by Cheil Industries Inc. is used.

(B) Polyphenylene Ether Resin

Polyphenylene ether (PPE) resin (Product name: LXR-035C) manufactured by Blue Star Inc. is used.

(C) Halogen Compound Containing Triazine Group

Bromine compound (Product name: FR-245) manufactured by ICL Inc is used.

(D) Antimony compound

Antimony compound (Product name: 99.5) manufactured by CHANGDE CHENZHOU ANTIMONY PRODUCT Inc. is used.

Example 1 to 12 and Comparative Examples 1 to 9

The above-mentioned components are used in the amounts set forth in Tables 1 and 2 below, mixed using a general mixer, and then the mixture is extruded using a twin-screw extruder having L/D=35 and Φ=45 mm to make pellets. Then the pellets are used to make specimens to measure color difference when exposed to an injection molding temperature of 220 to 240° C. and flame retardant specimens are prepared using a 15 oz injection molding device. The physical properties of the specimens are measured after leaving the specimens for 48 hours at a relative humidity of 50% and a temperature of 23° C.

As shown in Tables 1 and 2, the amounts of (A) and (B) are represented as % by weight based on 100% of the weight of (A) and (B), and the amounts of (C) and (D) are represented as parts by weight based on 100 parts by weight of (A) and (B).

TABLE 1

|     | Examples |   |   |   |   |   |   |   |   |   |   |   |
|-----|----|----|----|----|----|------|------|------|------|----|----|----|
|     | 1  | 2  | 3  | 4  | 5  | 6    | 7    | 8    | 9    | 10 | 11 | 12 |
| (A) | 97 | 97 | 97 | 97 | 97 | 93.5 | 93.5 | 93.5 | 93.5 | 90 | 90 | 90 |
| (B) | 3  | 3  | 3  | 3  | 3  | 6.5  | 6.5  | 6.5  | 6.5  | 10 | 10 | 10 |
| (C) | 11 | 13 | 15 | 17 | 20 | 20   | 20   | 20   | 15   | 13 | 20 | 20 |
| (D) | 3  | 3  | 3  | 3  | 3  | 1    | 2    | 3    | 3    | 3  | 3  | 1  |

TABLE 2

| | Comparative Examples | | | | | | | | |
|---|---|---|---|---|---|---|---|---|---|
| | 1 | 2 | 3 | 4 | 5 | 6 | 7 | 8 | 9 |
| (A) | 97 | 97 | 97 | 97 | 98 | 87 | 87 | 98 | 98 |
| (B) | 3 | 3 | 3 | 3 | 2 | 13 | 13 | 2 | 2 |
| (C) | 9 | 21 | 20 | 20 | 20 | 20 | 13 | 25 | 20 |
| (D) | 3 | 3 | — | 4 | 3 | 3 | 1 | 3 | 4 |

The test specimens are tested for various physical properties as follows and the results are set forth in Tables 3 and 4.

(1) Flame resistance is measured for a 1.5 mm thick specimen in accordance with UL 94.

fail: specimens are fully burned.

V1: after the specimens are burned for 10 seconds, and then the ignition source is eliminated, total burning time is 51 to 250 seconds and each burning time is 30 seconds or less.

V0: after the specimens are burned for 10 seconds, and then the ignition source is eliminated, total burning time is 0 to 15 seconds and each burning time is 10 seconds or less.

(2) Izod impact strength (kgf·cm/cm) is measured for a ⅛ inch thick specimen in accordance with ASTM D256 (un-notched)

(3) Spiral length (mm) is measured as a length of a specimen which is molded into a thickness of 2.0 mm and a width of 10 mm from the resin composition at 230° C.

(4) Degree of Blackness is measured as a value of L in accordance with ASTM D1925 using a CCM device manufactured by Konica Minolta, Inc.

(5) Injection molding thermal stability (also residence stability) is determined based on the number of gas bursts measured during residence of the composition in an injection molding device with an inner temperature of 250° C. for 10 minutes.

☆: 0 to 1 time, ◉: 2 to 4 times, ○: 5 to 10 times, Δ: 11 to 15 times, ×: more than 16 times (6) Specific gravity is measured in accordance with ASTM D792

TABLE 3

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Flame resistance | V0 | V0 | V0 | V0 | V0 | V0 | V0 | V0 | V0 | V0 | V0 | V0 |
| Izod impact strength | 12 | 12 | 11 | 13 | 11 | 13 | 12 | 12 | 12 | 15 | 12 | 14 |
| Spiral length (mm) | 420 | 450 | 520 | 530 | 550 | 510 | 510 | 510 | 480 | 430 | 470 | 470 |
| Degree of blackness | 31.1 | 31.3 | 31.2 | 31.1 | 31.4 | 27.5 | 29.1 | 32.3 | 32.5 | 32.9 | 33.1 | 27.3 |
| Injection Molding Thermal Stability | ☆ | ☆ | ◉ | ○ | Δ | ◉ | ○ | Δ | ◉ | ☆ | Δ | ◉ |
| Specific gravity | 1.135 | 1.140 | 1.148 | 1.145 | 1.155 | 1.149 | 1.150 | 1.155 | 1.148 | 1.140 | 1.155 | 1.148 |

| | Comparative Examples | | | | | | | | |
|---|---|---|---|---|---|---|---|---|---|
| | 1 | 2 | 3 | 4 | 5 | 6 | 7 | 8 | 9 |
| Flame resistance | fail | V0 | fail | V0 | V1 | V0 | V0 | V0 | V0 |
| Izod impact strength | 15 | 8 | 12 | 7 | 10 | 11 | 14 | 6 | 8 |
| Spiral length (mm) | 410 | 560 | 545 | 560 | 555 | 400 | 320 | 565 | 550 |
| Degree of blackness | 31.5 | 31.5 | 29.9 | 34.0 | 31.6 | 31.5 | 31.5 | 31.4 | 33.1 |
| Injection Molding Thermal Stability | ☆ | × | Δ | × | Δ | Δ | ☆ | × | × |
| Specific gravity | 1.130 | 1.155 | 1.153 | 1.160 | 1.155 | 1.155 | 1.135 | 1.162 | 1.160 |

As shown in Table 3, Examples 1 to 12 including the rubber-reinforced polystyrene resin (A), the polyphenylene ether resin (B), the halogen compound including a triazine group (C) and the antimony compound (D) in amounts within the ranges of the present invention can have a flame resistance of V0, can exhibit excellent impact strength, fluidity, colorability, and injection molding thermal stability and can have a low specific gravity.

In contrast, Comparative Example 1 including the halogen compound including a triazine group (C) in an amount less than the present invention exhibits deteriorated flame retardancy and fluidity. Comparative Example 2 including the halogen compound including a triazine group (C) in an amount greater than the present invention exhibits deteriorated impact strength and injection molding thermal stability. Comparative Example 3 including no antimony compound exhibits deteriorated flame retardancy, and Comparative Example 4 including the antimony compound in an amount greater than the present invention exhibits deteriorated impact strength, deteriorated injection molding thermal stability, and high specific gravity.

Comparative Example 5 including the rubber-reinforced polystyrene resin (A) in an amount greater than and the polyphenylene ether resin (B) in an amount less than the present invention exhibits deteriorated flame retardancy. Comparative Examples 6 and 7 including the rubber-reinforced polystyrene resin (A) in an amount less than and the polyphenylene ether resin (B) in an amount greater than the present invention exhibit deteriorated fluidity.

Comparative Example 8 including the rubber-reinforced polystyrene resin (A), the polyphenylene ether resin (B) and the halogen compound including a triazine group (C) in amounts outside of the present invention, and Comparative Example 9 including the rubber-reinforced polystyrene resin (A), the polyphenylene ether resin (B) and the antimony compound (D) in amounts outside of the present invention exhibit deteriorated impact strength, deteriorated injection molding thermal stability and high specific gravity.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant thermoplastic resin composition comprising:
   (A) about 90 to about 97% by weight of a rubber-reinforced polystyrene resin; and
   (B) about 3 to about 10% by weight of a polyphenylene ether resin;
   (C) about 10 to about 20 parts by weight of a halogen compound including a triazine group, or a mixture of the halogen compound including a triazine group and a diphenyl ethane bromide compound based on about 100 parts by weight of a base resin comprising (A) and (B); and
   (D) about 0.01 to about 3 parts by weight of an antimony compound based on about 100 parts by weight of a base resin comprising (A) and (B).

2. The flame retardant thermoplastic resin composition of claim 1, wherein the rubber-reinforced polystyrene resin (A) comprises about 1 to about 30% by weight of a rubber polymer and about 70 to about 99% by weight of an aromatic monoalkenyl monomer.

3. The flame retardant thermoplastic resin composition of claim 2, wherein the rubber-reinforced polystyrene resin (A) further comprises one or more monomers comprising an alkyl ester monomer of (meth)acrylic acid, vinyl cyanide monomer, or a combination thereof.

4. The flame retardant thermoplastic resin composition of claim 1, wherein the polyphenylene ether resin (B) comprises poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, a copolymer of poly(2,6-diethyl-1,4-phenylene)ether and poly(2,3,5-triethyl-1,4-phenylene)ether, or a combination thereof.

5. The flame retardant thermoplastic resin composition of claim 1, wherein the halogen compound including a triazine group is 2,4,6-tris(2,4,6-tribromophenoxy)-1,3,5-triazine.

6. The flame retardant thermoplastic resin composition of claim 1, wherein the diphenyl ethane bromide compounds is decabromodiphenyl ethane.

7. The flame retardant thermoplastic resin composition of claim 1, wherein the antimony compound (D) comprises antimony trioxide, antimony pentoxide, or a combination thereof.

8. The flame retardant thermoplastic resin composition of claim 1, wherein the flame retardant thermoplastic resin composition includes one or more additives selected from the group consisting of polymerization initiators, antioxidants, impact modifiers, lubricants, fillers, coupling agents, photo-stabilizers, antidripping agents, antistatic agents, dispersants, colorants, and combinations thereof.

9. The flame retardant thermoplastic resin composition of claim 1, wherein the flame retardant thermoplastic resin composition has a flame resistance of V0 measured for a 1.5 mm thick specimen in accordance with UL 94.

10. The flame retardant thermoplastic resin composition of claim 1, wherein the flame retardant thermoplastic resin composition has 0 to about 15 times of gas burst during residence in an injection molding device with an inner temperature of 250° C. for 10 minutes, an Izod impact strength of about 10 kgf·cm/cm to about 15 kgf·cm/cm measured for a ⅛ inch thick specimen in accordance with ASTM D256, and a length of a specimen of about 420 to about 550 mm measured after the resin composition is molded into a thickness of 2.0 mm and a width of 10 mm at 230° C.

11. A molded article comprising the flame retardant thermoplastic resin composition of claim 1.

12. The flame retardant thermoplastic resin composition of claim 1, comprising about 3 to 6.5 wt % of the polyphenylene ether resin (B).

* * * * *